(12) United States Patent
Domprobst et al.

(10) Patent No.: US 11,450,212 B2
(45) Date of Patent: Sep. 20, 2022

(54) METHOD FOR MANAGING A PLATOON OF TRUCKS ON THE BASIS OF INFORMATION RELATING TO THE TIRES WITH WHICH THE TRUCKS OF SAID PLATOON ARE EQUIPPED

(71) Applicant: Compagnie Generale Des Etablissements Michelin, Clermont-Ferrand (FR)

(72) Inventors: Frederic Domprobst, Clermont-Ferrand (FR); Nicolas Fangeat, Clermont-Ferrand (FR); Thomas Ledoux, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 154 days.

(21) Appl. No.: 16/772,622

(22) PCT Filed: Dec. 18, 2018

(86) PCT No.: PCT/FR2018/053383
§ 371 (c)(1),
(2) Date: Jun. 12, 2020

(87) PCT Pub. No.: WO2019/122695
PCT Pub. Date: Jun. 27, 2019

(65) Prior Publication Data
US 2020/0388164 A1    Dec. 10, 2020

(30) Foreign Application Priority Data

Dec. 22, 2017 (FR) .................................. 1762908

(51) Int. Cl.
*G08G 1/00* (2006.01)
*B60W 40/064* (2012.01)
*G05D 1/02* (2020.01)

(52) U.S. Cl.
CPC ............. *G08G 1/22* (2013.01); *B60W 40/064* (2013.01); *G05D 1/0293* (2013.01);
(Continued)

(58) Field of Classification Search
CPC .................. G08G 1/22; B60W 40/064; B60W 2554/802; B60W 2530/20; G05D 1/0293; G05D 2201/0213
See application file for complete search history.

(56) References Cited

U.S. PATENT DOCUMENTS 4,779,447 A * 10/1988 Rath ....................... B60T 8/172
73/9
5,777,451 A    7/1998 Kobayashi et al.
(Continued)

FOREIGN PATENT DOCUMENTS

CN     101859494 A * 10/2010 ............. G08G 1/163
CN     102689595 A    9/2012
(Continued)

OTHER PUBLICATIONS

International Search Report issued in PCT/FR2018/053383, dated Apr. 11, 2019.

*Primary Examiner* — Peter D Nolan
*Assistant Examiner* — Kenneth M Dunne
(74) *Attorney, Agent, or Firm* — Dickinson Wright PLLC; Steven Hurles

(57) ABSTRACT

The method for organizing a group of several separate vehicles in a platoon includes an identification step (a) in order to identify the candidate vehicles that are to form the platoonp The method also includes an acquisition step (b) in
(Continued)

order to acquire, for each candidate vehicle, at least one parameter associated with a tire of the candidate vehicle, such as the wet grip index of the tire tyre, referred to as the "tire parameter". Subsequently, based on the tire parameter, a processing step (c) for determining the rank attributed to the particular candidate vehicle in the platoon and/or the inter-vehicle distance which, at a given speed, must separate the candidate vehicle in question from the vehicle immediately in front in the platoon.

13 Claims, 2 Drawing Sheets

(52) U.S. Cl.
CPC ... *B60W 2530/20* (2013.01); *B60W 2554/802* (2020.02); *G05D 2201/0213* (2013.01)

(56) References Cited

U.S. PATENT DOCUMENTS

| | | | |
|---|---|---|---|
| 9,632,507 B1* | 4/2017 | Korn | G08G 1/22 |
| 9,663,115 B2* | 5/2017 | Singh | G01M 17/02 |
| 2005/0234628 A1* | 10/2005 | Luders | B60W 40/068 |
| | | | 701/80 |
| 2013/0054125 A1* | 2/2013 | Bruemmer | G01C 21/34 |
| | | | 701/123 |
| 2013/0096248 A1* | 4/2013 | Thompson | B60C 1/0016 |
| | | | 524/526 |
| 2015/0284021 A1* | 10/2015 | Singh | B60C 23/20 |
| | | | 701/41 |
| 2017/0308097 A1 | 10/2017 | Switkes et al. | |
| 2018/0194178 A1* | 7/2018 | Jecker | B60C 11/243 |
| 2019/0084537 A1* | 3/2019 | Kasper | B60T 8/17551 |
| 2019/0196501 A1* | 6/2019 | Lesher | G08G 1/166 |
| 2019/0232962 A1* | 8/2019 | Broil | H04W 4/46 |
| 2020/0027355 A1* | 1/2020 | Sujan | H04W 4/023 |
| 2020/0298882 A1* | 9/2020 | Kobayashi | B60W 30/16 |
| 2021/0174687 A1* | 6/2021 | Sasmal | B60W 40/10 |
| 2021/0229670 A1* | 7/2021 | Singh | B60W 40/064 |
| 2022/0017090 A1* | 1/2022 | Sams | B60W 30/162 |

FOREIGN PATENT DOCUMENTS

| | | | | |
|---|---|---|---|---|
| CN | 106796163 A | | 5/2017 | |
| DE | 10306498 A1 | * | 8/2004 | B60C 11/24 |
| DE | 102013013232 A1 | * | 2/2015 | B60W 30/16 |
| DE | 102014200804 A1 | * | 7/2015 | G05D 1/0217 |
| DE | 102015206220 A1 | * | 10/2016 | |
| DE | 102015115852 A1 | * | 3/2017 | B60T 8/1708 |
| GB | 2340568 A | * | 2/2000 | B60T 8/18 |
| WO | WO-2016013996 A1 | * | 1/2016 | G05D 1/0295 |
| WO | WO-2017147007 A1 | * | 8/2017 | |

* cited by examiner

METHOD FOR MANAGING A PLATOON OF TRUCKS ON THE BASIS OF INFORMATION RELATING TO THE TIRES WITH WHICH THE TRUCKS OF SAID PLATOON ARE EQUIPPED

CROSS-REFERENCE TO RELATED APPLICATION

This application claims priority to PCT Application No. PCT/FR2018/053383, filed on Dec. 18, 2018, entitled "METHOD FOR MANAGING A PLATOON OF TRUCKS ON THE BASIS OF INFORMATION RELATING TO THE TYRES WITH WHICH THE TRUCKS OF SAID PLATOON ARE EQUIPPED" and to French Application No. 1762908, filed on Dec. 22, 2017, entitled "METHOD FOR MANAGING A PLATOON OF TRUCKS ON THE BASIS OF INFORMATION RELATING TO THE TYRES WITH WHICH THE TRUCKS OF SAID PLATOON ARE EQUIPPED".

BACKGROUND OF THE INVENTION

1. Field of the Invention

The present disclosure relates to the field of managing platoons of vehicles, and more particularly managing platoons of trucks.

2. Related Art

A platoon of trucks is a group of trucks that are operated in a line, a short distance from each other, in order to reduce the footprint of the convoy of trucks on the road, and thus improve traffic, but also and above all in order to limit energy losses, and therefore excessive fuel consumption, resulting from the individual aerodynamic drag of each truck.

Of course, in order to ensure the safety of the convoy in light of the small distances separating the trucks belonging to the platoon from each other, automated control means are provided that make each following truck capable of automatically adjusting its individual driving behaviour, and particularly its braking, as a function of the driving behaviour of the truck that precedes it in the platoon.

In this regard, it is particularly known to define, for a given running speed, a separation distance between the successive trucks, known as the inter-vehicle distance, that is set as a function of the reaction time of the following trucks, which reaction time depends on the period necessary for the automated control means of each following truck to detect a change in the driving behaviour of the lead truck and/or the truck that precedes the following truck in question, and to process this information in order to adjust the driving behaviour of said following truck accordingly.

However, the inventors have noted that, although such a method for defining the inter-vehicle distance in light of the response time of the automated control means is relatively well-suited to ideal situations, in which the trucks, together with their loads, are all identical, said method for defining the inter-vehicle distance is however incapable of genuinely taking into account the specific features and multitude of actual situations encountered by managers of truck fleets who are liable of or wish to operate in a platoon trucks that in practice inevitably have different features and/or loads.

SUMMARY OF THE INVENTION

The objects assigned to the present disclosure therefore aim to overcome the aforementioned drawbacks and propose a new method for organizing a platoon of vehicles, and more particularly a platoon of trucks, that makes it possible to optimize the arrangement of said platoon under all circumstances, despite any disparities between the vehicles.

The objects assigned to the present disclosure are achieved by means of a method for organizing a group of several separate vehicles into a platoon, within which said vehicles are ordered into a line, and within which each vehicle following at least one other vehicle in said platoon is capable of automatically adjusting its individual driving behaviour as a function of the driving behaviour of one or more vehicles in the platoon that precede said vehicle in said line, said method including the following steps:

an identification step (a), during which the vehicles intended to form the platoon, known as "candidate vehicles" are identified, each of said candidate vehicles being provided with at least one axle that comprises at least one tire providing contact between said candidate vehicle and the ground, an acquisition step (b), during which, for each candidate vehicle, at least one parameter is acquired that is linked to said at least one tire providing the contact between said candidate vehicle and the ground, known as the "tire parameter", a processing step (c), during which, on the basis of said tire parameter, the rank is determined that is attributed to the candidate vehicle in question in the platoon and/or the inter-vehicle distance is determined that must separate, at a given speed, the candidate vehicle in question from the vehicle that immediately precedes said candidate vehicle in the platoon.

Advantageously, the method according to the present disclosure therefore proposes taking into account, particularly during the formation of the platoon and or a subsequent rearrangement of said platoon, an item of information that represents the situation or the tire or tires of each vehicle in question.

As the tires are members that are both specific to the vehicle in question and decisive regarding the grip of said vehicle on the road, and therefore regarding the braking capacity of said vehicle, taking in account such a tire parameter, according to the present disclosure, particularly makes it possible to estimate accurately the actual reaction capacity, and particularly the actual braking capacity, of each vehicle in the platoon.

More particularly, the present disclosure makes it possible to evaluate and take into account, reliably and very precisely, the individual braking performance of each vehicle, and to compare these individual braking performances of the vehicle in question with the braking performances of the other vehicles forming the platoon.

The order of the platoon can therefore be determined with full knowledge of the facts, and preferably each vehicle can be assigned a rank that is higher the better its braking capacity, so that the vehicle that brakes best is at the back of the platoon, and the vehicle that brakes least well is at the front of the platoon.

The inter-vehicle distance between each following vehicle and the vehicle that immediately precedes it can thus also be adjusted precisely on a case-by-case basis so that said inter-vehicle distance is minimal, and just necessary and sufficient to prevent a collision between two consecutive vehicles, particularly in the event of emergency braking.

The present disclosure thus makes it possible, completely safely, to optimize the closeness of the vehicles, and therefore to optimize the energy savings that are made by minimizing the aerodynamic drag effect.

The present disclosure is also advantageously applicable regardless of the brand of vehicle (that is, the vehicle manufacturer) or the type of vehicle (particularly whether it is a straight truck, also known as a rigid truck, or a semi-trailer, for example), and whatever the load of the vehicle, which makes the method very versatile, particularly making it possible to group vehicles, and in particular to group trucks, into "multi-brand" platoons.

BRIEF DESCRIPTION OF THE DRAWINGS

Further details of objects, features and advantages of the present disclosure will become apparent on reading the following description and with reference to the attached drawings, given purely by way of non-limitative illustration, in which.

DETAILED DESCRIPTION OF THE ENABLING EMBODIMENT

The present disclosure relates to a method for organizing a group of several separate vehicles 1, 101, 201 into a platoon 2.

Figure 1:
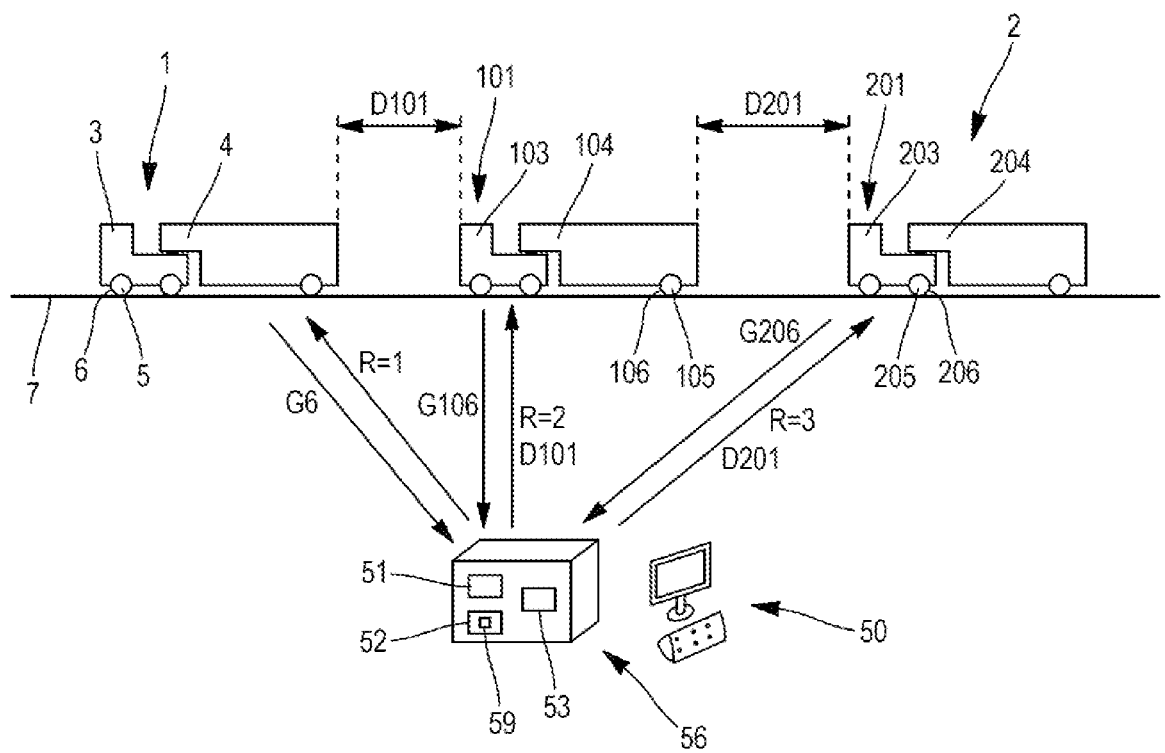
FIG. 1 is a diagrammatic view of the implementation of a vehicle platoon, and more particularly a truck platoon, according to the present disclosure.
Figure 2:
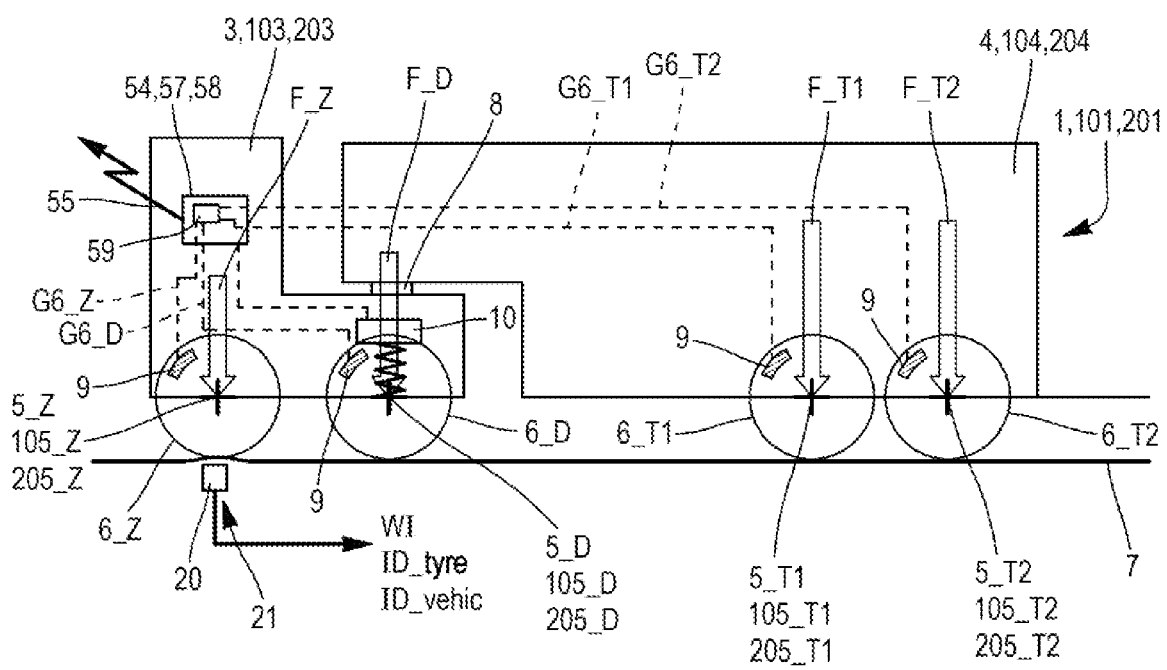
FIG. 2 is a diagrammatic view of the acquisition, within a candidate vehicle, of parameters, and particularly tire parameters, useful for the implementation of a method for organizing a platoon according to the present disclosure.

Preferably, as particularly illustrated in FIGS. 1 and 2, said vehicles 1, 101, 201 will be formed by trucks, and more preferably by semi-trailers, each comprising a tractor unit 3, 103, 203 to which a trailer 4, 104, 204 is hitched.

Any wheeled land vehicle, the gross vehicle weight rating (GVWR) of which is greater than 3.5 tonnes, can particularly be considered to be a truck.

Within said platoon 2, the vehicles 1, 101, 201 are ordered into a line.

By convention in the description, the vehicle in the platoon 2 that is at the front of said line will be called the "lead vehicle" 1 and the vehicle or vehicles in the platoon that follow behind the lead vehicle in said line will be called the "following vehicle(s)" 101, 201.

Preferably, the vehicles 1, 101, 201 of the platoon 2 follow one behind the other in a single lane, in a single line, comprising a single front vehicle.

However, as a variant, it would be possible, without departing from the scope of the present disclosure, to apply the method to the organization of a platoon 2 comprising several front vehicles, so as to form several parallel lines spread over the corresponding number of traffic lanes.

Within said platoon 2, each vehicle following at least one other vehicle of said platoon 2, that is, each following vehicle 101, 201, is capable of automatically adjusting its individual driving behaviour as a function of the driving behaviour of one or more vehicles 1, 101 of the platoon that precede said vehicle in the line.

More particularly, each following vehicle 101, 201 will be capable of detecting a slowing of the lead vehicle 1 and/or of at least one of the vehicles that precede said following vehicle in the platoon 2, and more particularly a slowing of the vehicle that immediately precedes said following vehicle in the platoon 2, and of reacting by automatically triggering an appropriate braking action.

To this end, each vehicle 1, 101, 201 in question will advantageously be provided with automated control means, and more particularly automated means for detecting the driving behaviour of the other vehicles, and automated means for adjusting its own driving behaviour, as will be described in detail below.

More generally, the partially or fully automatic driving of the vehicles 1, 101, 201, and in particular the following vehicles 101, 201, can be envisaged.

For example, provision can be made for each following vehicle to automatically adjust its speed, acceleration, braking, and even its steering control, as a function of the behaviour of the lead vehicle and/or as a function of the vehicle immediately preceding the vehicle in question and, preferably, for each following vehicle to thus be able to follow the same trajectory as the lead vehicle.

Provision can preferably be made for the lead vehicle 1, which is at the front of the platoon 2 at the moment in question, to communicate with the following vehicle or vehicles 101, 201 so as to immediately inform all of the following vehicles of a change in its driving behaviour, and particularly the application of braking, particularly emergency braking, in order to reduce the reaction time of the following vehicle or vehicles 101, 201.

Preferably, and if applicable in addition to means for exchanging information with the lead vehicle 1, each vehicle 1, 101, 201 will be individually provided with its own means for detecting obstacles and/or controlling distance relative to a vehicle in front of it, so that it can adjust its speed and/or braking action autonomously, particularly as a function of the driving behaviour of the vehicle 1, 101 that precedes it in the platoon 2.

Of course, the vehicles 1, 101, 201 remain separate from each other within the platoon 2, and in particular do not create mechanical links between them, so that each vehicle 1, 101, 201 autonomously uses, relative to the other vehicles in the platoon, its own propulsion, steering and braking means in order to adjust its individual behaviour as a function of the behaviour of all or some of the other vehicles in the platoon.

It will also be noted that the order of the vehicles 1, 101, 201 in the platoon 2 can be changed over time, particularly so that several different vehicles can succeed each other over time as the lead vehicle, so that the benefit of the reduction in fuel consumption linked to the reduction in aerodynamic drag is shared fairly between the different vehicles in the platoon.

Similarly, the lead vehicle can be replaced, when it reaches its destination and leaves the platoon 2, by another lead vehicle succeeding it.

Each vehicle 1, 101, 201 in the platoon 2 will stay in the platoon 2 until it reaches a predetermined destination, at which said vehicle will leave the platoon 2.

The platoon 2 can of course be reorganized with the remaining vehicles and/or with new vehicles wishing to join said platoon 2.

According to the present disclosure, the method comprises an identification step (a), during which the vehicles 1, 101, 201 intended to form the platoon 2, known as "candidate vehicles", are identified.

In practice, the platoon will preferably contain, by way of illustration, two to ten vehicles, and typically between three and eight vehicles. Of course, the platoon could contain more vehicles without departing from the scope of the present disclosure.

Each of the candidate vehicles 1, 101, 201 is provided with at least one axle 5, 105, 205 that comprises at least one tire 6, 106, 206 providing contact between said candidate vehicle 1, 101, 201 and the ground 7.

In practice, the tire or tires 6, 106, 206 preferably provide, in a manner known per se, rolling contact between said candidate vehicle 1, 101, 201 and the ground 7.

When the candidate vehicle 1, 101, 201 is a semi-trailer, for ease of description, a distinction can preferably be made between three types of axle, as illustrated in FIG. 2:

- a front axle of the tractor unit 3, forming a steering axle 5_Z, 105_Z, 205_Z, which holds steered wheels that can be moved about the yaw axis, and which makes it possible to control the steering angle of the vehicle 1, 101, 201; by convention, such a steering axle can be identified by means of the reference sign "Z", which refers to the term "Steer";
- a rear axle of the tractor unit 3, forming a drive axle 5_D, 105_D, 205_D, which transmits drive torque to the tire 6, 106, 206 and therefore to the ground, so as to move the vehicle 1, 101, 201 forwards; by convention, such a drive axle can be identified by means of the reference sign "D", which refers to the term "Drive"; preferably, said drive axle 5_D, 105_D, 205_D will be situated substantially in line vertically with the fifth wheel 8 that makes it possible to hitch the trailer 4, 104, 204 to the tractor unit 3, 103, 203;
- a trailer axle 5_T, 105_T, 205_T, which is provided on and supports the trailer 4, 104, 204; by convention, such a trailer axle can be identified by means of the reference sign "T", which refers to the term "Trailer".

Of course, it is entirely possible for the vehicle 1, 101, 201 to have several axles of the same type, for example several drive axles 5_D, 105_D, 205_D, and/or several trailer axles 5_T, 105_T, 205_T, without departing from the scope of the present disclosure.

For example, FIG. 2 thus shows a trailer 4 comprising two trailer axles 5_T1, 5_T2 (respectively a trailer 104 with two trailer axles 105_T1, 105_T2, and a trailer 204 with two trailer axles 205_T1, 205_T2).

Similarly, each axle 5, 105, 205 can, in a manner known per se, comprise several tires, for example two tires 6, 106, 206 on the same axle, or even four tires 6, 106, 206 on the same axle, if dual wheels are used.

According to the present disclosure, the method comprises an acquisition step (b), during which, for each candidate vehicle 1, 101, 201, at least one parameter is acquired, known as the "tire parameter", here denoted G6, G106, G206, which is linked to said at least one tire 6, 106, 206 providing the contact between said candidate vehicle and the ground 7.

It will be noted that, when it is necessary to distinguish between tires on the same vehicle, or between tire parameters originating from different tires on the same vehicle, the same reference sign convention as used previously can particularly be applied: Z for "Steer", D for "Drive" and T for "Trailer", if necessary supplemented with an incremental number.

For example, a tire parameter taken from a tire 6 on the steering axle 5Z of the first vehicle 1 can thus be denoted G6_Z, and a tire parameter taken from a tire 106 belonging to the second trailer axle 105_T2 of the second vehicle 101 can be denoted G106_T2.

Advantageously, as mentioned above, collecting an item of information originating from the tire 6, 106, 206 firstly provides information that is specific to the candidate vehicle in question, and that can vary from one candidate vehicle to another, or that can vary over time on the same vehicle.

Such an item of information can therefore make it possible to characterize each vehicle based on an objective criterion, and therefore to compare the candidate vehicles with each other in order to make a distinction between the various candidate vehicles, according to this objective criterion, which is relevant for organizing the platoon 2.

An item of information relating to a tire 6, 106, 206 also makes it possible to characterize the road holding of the candidate vehicle 1, 101, 201, and more particularly to quantify the braking capacity of the axle 5, 105, 205 in question, and therefore the overall braking capacity of the candidate vehicle.

It therefore becomes possible to compare and order the candidate vehicles on the basis of an objective criterion representing the grip and braking capacity of each vehicle at the moment in question.

The platoon 2 can therefore be arranged with full knowledge of the facts, in an optimized manner.

In this regard, according to the present disclosure, after the acquisition step (b) the method then comprises a processing step (c), during which, on the basis of the tire parameter G6, G106, G206, the rank R is determined that is attributed to the candidate vehicle 1, 101, 201 in question in the platoon 2 and/or the inter-vehicle distance D101, D201 is determined that must separate, at a given speed, the candidate vehicle 101, 201 in question from the vehicle 1, 101 that immediately precedes said candidate vehicle in the platoon 2.

The rank R=1, 2, 3, etc. corresponds to the sequence number attributed to the candidate vehicle 1, 101, 201, and therefore to the place said vehicle must take in the line.

The lead vehicle 1 thus receives the rank R=1, the vehicle 101 that immediately follows said lead vehicle 1 receives the rank R=2, etc.

Preferably, the inter-vehicle distance D101, D201 can vary from one pair of vehicles to another, as a function of the relative braking performance of the following vehicle in question relative to the vehicle that precedes it.

Each inter-vehicle distance D101, D201 can thus be adjusted on a case-by-case basis, without having to impose a single identical inter-vehicle distance between each pair of consecutive vehicles in the platoon 2.

In any event, as the aim of forming a platoon 2 is to operate the vehicles at a small distance from each other, particularly in order to limit the effects of aerodynamic drag, said inter-vehicle distance D101, D201 will preferably correspond, when the vehicles 1, 101, 201 are travelling at a non-zero speed, to a gap that will have a real influence on aerodynamic drag, and that will to this end preferably be between 5 m and 25 m.

By way of preferred example, for longitudinal speeds of the vehicles 1, 101, 201 of between 60 km/h and 100 km/h, and more particularly between 70 km/h and 90 km/h, which typically correspond to travelling speeds possible on a motorway or on a good quality major road, the inter-vehicle distance D101, D201 will preferably be less than or equal to 25 m, and for example preferably between 5 m and 15 m.

Of course, the present disclosure also relates as such to a system 50 for managing a platoon 2 of vehicles, suitable for organizing a platoon 2 of several separate vehicles 1, 101, 201, each of said vehicles being provided with at least one axle 5, 105, 205 that comprises at least one tire 6, 106, 206 providing contact between said vehicle 1, 101, 201 and the ground 7.

This system 50 will provide a physical infrastructure, preferably an electronic infrastructure, making it possible to implement the method.

According to the present disclosure, such a system 50 comprises the following electronic processing units:

an identification unit 51 which, during the identification step (a), identifies and lists the vehicles 1, 101, 201 intended to form the platoon 2, known as "candidate vehicles", a characterization unit 52 which, during the acquisition step (b), collects, for each candidate vehicle 1, 101, 201, at least one parameter G6, G106, G206 linked to said at least one tire 6, 106, 206 providing the contact between said candidate vehicle and the ground 7, known as the "tire parameter" G6, G106, G206, an ordering unit 53 which, during the processing step (c), determines, on the basis of said tire parameter G6, G106, G206, a rank R that said ordering unit assigns to the candidate vehicle 1, 101, 201 in question in the platoon 2 and/or an inter-vehicle distance D101, D201 setpoint that sets the distance that must separate, at a given speed, the candidate vehicle 101, 201 in question from the vehicle 1, 101 that immediately precedes said candidate vehicle in the platoon 2.

Preferably, the inter-vehicle distance D101, D201 selected will correspond to the minimum distance that can be accepted in view of the braking safety requirements at the speed in question.

It will also be noted that the aforementioned electronic units 51, 52, 53 may for example be brought together within a platoon formation module 54 that will be provided on each candidate vehicle 1, 101, 201.

According to such a variant, each vehicle 1, 101, 201 will thus be able to interact independently, by means of its platoon formation module 54 provided with relevant telecommunications means 55, with any other vehicle 1, 101, 201 provided with a compatible similar module 54, and thus freely form or join a platoon 2, which will be composed and arranged autonomously by the candidate vehicles 1, 101, 201 interacting with each other.

According to another possible variant, said electronic units 51, 52, 53 can be located on one or more remote servers 56, and for example situated on a computer server 56 hosted by a platoon organization service provider, with which each candidate vehicle 1, 101, 201 wishing to form a platoon 2 or join an existing platoon 2, communicates by means of telecommunications means 55 that are associated with the on-board computer network 57 of said vehicle, such as a CAN (Controller Area Network) bus, or by means of telecommunications means 55 associated with, and preferably incorporated into, an additional platoon management box 58 added to said vehicle.

According to one possible variant, the candidate vehicle or vehicles 1, 101, 201 can communicate with the platoon organization remote server 56 by means of a matching server, which is separate from said platoon organization remote server 56, and is owned and controlled by a third party, such as a fleet manager that owns or manages the candidate vehicle or vehicles 1, 101, 201 in question.

The present disclosure is of course applicable regardless of the type and whatever the number of interfaces and electronic units 51, 52, 53 used in order to enable the vehicles 1, 101, 201 to interact and form the platoon 2, and whatever the location for processing the information, whether the information is delivered unprocessed by the candidate vehicle 1, 101, 201 to a remote server 56, or processed on board the candidate vehicle 1, 101, 201 according to all or some of the steps of the method according to the present disclosure.

The tire parameter G6, G106, G206 selected can be any feature intrinsic to the tire 6, 106, 206 in question (such as the chemical composition of the tire, the shape of the tread patterns, the type of tire: summer or winter, a grip index for which said tire has received type approval in accordance with a standardized test, etc.) or any feature relating to the state of the tire (temperature, pressure, wear, position on the vehicle, etc.), provided that said feature is relevant for characterizing and quantifying an influence of the tire 6, 106, 206 in question on the driving behaviour of the vehicle 1, 101, 201.

Of course, one tire parameter from the aforementioned tire parameters, or several tire parameters from said aforementioned tire parameters, can be selected for the application of the method according to the present disclosure.

Preferably, a tire parameter G6, G16, G206 collected and used in order to determine the rank R of the candidate vehicle 1, 101, 201 in the platoon 2 and/or the inter-vehicle distance D101, D201 is a grip index that quantifies the capacity of the tire 6, 106, 206 in question to grip the ground during braking.

Advantageously, such a grip index is representative of the actual braking power of the vehicle in question, and therefore the stopping distance of the vehicle in question.

By convention, the braking capacity is considered to be better, and therefore the stopping distance correspondingly shorter, the higher the grip index.

Taking into account a grip index according to the present disclosure advantageously makes it possible to order the platoon 2 preferably in an order of braking capacity, and to assign each candidate vehicle a rank R that is higher the higher the grip index, and therefore the shorter the stopping distance, which makes it possible to place the vehicle 1 that brakes least well ahead of the platoon 2, and the vehicle that brakes best at the back of the platoon 2.

This thus provides assurance that each following vehicle 101, 201 will be capable of stopping, particularly in the event of emergency braking, more quickly than the vehicle 1, 101 that precedes it, thus making it possible to minimize the inter-vehicle distance D101, D201 safely, without any risk of collision.

For ease of description, the grip index and the tire parameter G6, G106, G206 can be seen as one and the same hereinafter.

According to one preferred variant, the grip index G6, G106, G206 in question corresponds to a wet grip index, preferably a wet grip index defined by a standard.

More particularly, such a wet grip index can for example be the wet grip index defined by European Regulation (EU) No 288/2011 if the candidate vehicle is a passenger vehicle, or by ISO 15222 (ISO 15222:2011), if the candidate vehicle is a truck or van.

Of course, for the application of the method according to the present disclosure, any equivalent standard applicable in the country in question that makes it possible to define a wet grip index could be used.

A grip index representing the behaviour of the tire 6, 106, 206 and therefore of the vehicle 1, 101, 201 on wet ground is preferably taken into account, as wet ground generally corresponds to the worst case braking scenario, in that the grip of the tire 6, 106, 206 is much lower on wet ground than on dry ground.

By organizing the platoon 2 on the basis of an unfavourable assumption of emergency braking on wet ground, it makes sure that all of the necessary safety margins are therefore applied.

In practice, the wet grip index results from a standardized test during which the braking performance on wet ground 7 of a vehicle provided with the tire 6, 106, 206 in question is compared to the braking performance of the same vehicle provided with a standard reference tire, known as SRTT, for Standard Reference Truck Tire, to which a wet grip index of 1.00 (that is, equivalent to 100%) conventionally corresponds.

The conditions of these normalized tests are preferably set out by ISO 15222 for trucks and buses, which come under a tire class known as C3, and vans, which come under a tire class known as C2, and by European Regulation (EU) No 228/2011 for passenger vehicles, which come under a tire class known as C1. Of course, here again, reference can be made mutatis mutandis to any equivalent standard applicable in the country in question, without departing from the scope of the present disclosure.

Advantageously, the use of a standardized grip index, which is by its nature independent of the brand of the tire 6, 106, 206 or the brand or type of the vehicle 1, 101, 201, makes it possible to reliably and objectively evaluate and compare very different vehicles by using a common reference, particularly regardless of the respective brand of each of said vehicles.

This information relating to the wet grip index is also systematically and publicly available, as it is the result of type approval tests that the manufacturer of the tire 6, 106, 206 must carry out before marketing said tire, and forms part of standardized regulatory labelling that must be affixed by the manufacturer on the sidewall of said tire, in accordance for example with European Regulation (EC) No 1222/2009. The standardized, systematic and public nature of the wet grip index advantageously makes the method according to the present disclosure easy to apply generally from an industrial point of view.

Of course, here again, reference can be made mutatis mutandis to any equivalent standard applicable in the country in question, without departing from the scope of the present disclosure. However, for ease of description, reference will preferably be made hereinafter to the standards and regulations applicable in Europe.

In practice, the wet grip index measured during the standardized tests will make it possible to assign the tire a grip class, symbolized by a letter from A to F.

A look-up table showing the wet grip index value, denoted "G" (the value of which is 1.00 for the SRTT) and the grip class, taken from the aforementioned European Regulation (EC) No 1222/2009, is reproduced below:

TABLE 1

| C3 tires (trucks) | |
| --- | --- |
| Wet grip index | Wet grip class |
| $G \geq 1.25$ | A |
| $1.10 \leq G \ 1.24$ | B |
| $0.95 \leq G \leq 1.09$ | C |
| $0.80 \leq G \leq 0.94$ | D |
| $0.65 \leq G \leq 0.79$ | E |
| $G \leq 0.64$ | F |

Particularly preferably, the grip index G6, G106, G206 corresponds to a wet grip index value that is deduced from a standardized wet grip class that is shown on the identification labelling of the tire 6, 106, 206.

The identification labelling, and more particularly the wet grip class, can preferably be produced in accordance with European Regulation (EC) No 1222/2009. Of course, here again, reference can be made mutatis mutandis to any equivalent standard or regulation applicable in the country in question, without departing from the scope of the present disclosure.

Preferably, the characterization unit 52 includes a grip index acquisition module 59 that collects a tire parameter G6, G106, G206 that represents the wet grip class of the at least one tire 6, 106, 206 in question.

Advantageously, such a tire parameter G6, G106, G206 can be easily and reliably acquired, as the wet grip class is one of the items of information that the manufacturer is obliged to certify and make available to the user, and this information appears in particular explicitly on the labelling present on the sidewall of the tire.

For ease of calculation and realism regarding the representativeness of the wet grip index taken into account, the wet grip index G6, G106, G206 to be applied can for example be considered to correspond:

to the average value of the index for the grip class, when said grip class corresponds to a range of grip indices that lies between a lower threshold and an upper threshold (as is the case for classes B to E); with reference to Table 1 above, for a tire in grip class B, $G6(B)=(1.10+1.24)/2=1.17$ would thus be applied;

to the threshold that delimits the grip class, when said grip class is defined by reference to a single threshold index (as is the case for classes A and F); in the example above, $G6(A)=1.25$ would be applied for the upper grip class, that is, class A.

Of course, any appropriate means may be used in order to enable the grip index acquisition module 59 to collect the tire parameter G6, G106, G206 representing the wet grip index.

The entry of the information could thus be envisaged by means of an optical reader capable of reading the sidewall labelling of the tire, or by means of an appropriate human-machine interface enabling an operator to enter, inter alia, the class of each tire.

As a variant, an identifier ID_tire of the tire 6, 106, 206, such as a serial number, could be recorded, and this identifier ID_tire information could be cross-referenced with a database that contains the information regarding the wet grip class for which said tire has received type approval.

Preferably, the tire parameter G6, G106, G206, and more particularly the wet grip class, is obtained by remote transmission on the basis of an item of information transmitted by a transponder 9 implanted in the tire 6, 106, 206 in question.

This facilitates a fast, automatic, reliable acquisition of the tire parameter G6, G106, G206.

The transponder 9 can advantageously form an identification transponder and comprise to this end a radio-frequency identification (RFID) chip that can be read remotely by an appropriate sensor.

The transponder 9 can contain a tire identifier ID_tyre, such as a serial number, on the basis of which the value of the tire parameter G6, G106, G206 sought can be found or confirmed, and more particularly on the basis of which the grip class of the tire can be found or confirmed, by cross-referencing this identifier ID_tire with a database.

According to one variant, the transponder 9 can itself directly contain the value of the tire parameter G6, G106, G206 sought, and more particularly the wet grip class and/or the wet grip index for which the tire 6, 106, 206 has received type approval, in a non-volatile memory, and transmit it on request.

According to one possible embodiment, the transponder 9 can form part of, or be associated with, a Tire Monitoring System (TMS) or a Tire Pressure Monitoring System (TPMS), which is capable of measuring and monitoring one or more parameters representing the state of the tire, such as the inflation pressure inside the casing defined by the tire, the temperature of said tire, a stress state in a particular zone of said tire, etc.

Said tire monitoring system TMS, TPMS, can be formed for example by a micro-electro-mechanical system.

The transponder 9, and more particularly its RFID chip and/or the associated tire monitoring system TMS, TPMS, are advantageously incorporated into the structure of the tire 6, 106, 206 when it is manufactured.

To this end, the transponder 9, its RFID chip and/or the tire monitoring system TMS, TPMS can particularly take the form of a cured-in insert in the rubber of the tire, or the form of a patch affixed to the inside of the tire casing before curing and rigidly connected to said casing during the step of curing/vulcanization of the tire, or the form of a label attached by gluing to the inside of the tirecasing, after vulcanization of said casing.

Preferably, the candidate vehicle 1 in question comprises a plurality of axles $5\_Z$, $5\_D$, $5\_T1$, $5\_T2$ that are each provided with at least one tire $6\_Z$, $6\_D$, $6\_T1$, $6\_T2$ providing the contact between said candidate vehicle 1 and the ground 7.

A grip index $G6\_Z$, $G6\_D$, $G6\_T1$, $G6\_T2$ of the at least one tire $6\_Z$, $6\_D$, $6\_T1$, $6\_T2$ of each axle $5\_Z$, $5\_D$, $5\_T1$, $5\_T2$ can then preferably be collected during the acquisition step (b).

Particularly preferably, the grip index $G6\_Z$, $G6\_D$, $G6\_T1$, $G6\_T2$ collected is a wet grip index, if applicable obtained on the basis of an item of wet grip class information, as mentioned above.

It will be noted that, in order to simplify the description and FIG. 2, reference will preferably be made herein to a single candidate vehicle 1 and to the axles and tires thereof, it being understood that the present disclosure can apply mutatis mutandis to any candidate vehicle 1, 101, 201.

Preferably, the load $F\_Z$, $F\_D$, $F\_T1$, $F\_T2$ that is exerted by the vehicle 1 on each of said axles $5\_Z$, $5\_D$, $5\_T1$, $5\_T2$ is also evaluated.

Said load $F\_Z$, $F\_D$, $F\_T1$, $F\_T2$ specific to each of the axles $5\_Z$, $5\_D$, $5\_T1$, $5\_T2$ of the vehicle 1 in question preferably corresponds to a single-weight vertical load component.

Typically, the load $F\_Z$, $F\_D$, $F\_T1$, $F\_T2$ per axle will correspond to the distribution, on the axles of the vehicle 1, of the unladen weight of said vehicle 1 increased by the weight of the cargo and/or the passengers transported by said vehicle 1.

For the sake of simplicity, a static load can be considered.

As a variant, a dynamic load can be evaluated that takes into account the inertial effects linked to deceleration during braking.

Preferably, the load will be evaluated when the vehicle 1 is on horizontal ground 7.

The load $F\_Z$, $F\_D$, $F\_T1$, $F\_T2$ exerted on each axle $5\_Z$, $5\_D$, $5\_T1$, $5\_T2$, respectively the load $F\_Z$, $F\_D$, $F\_T1$, $F\_T2$ exerted on each tire $6\_Z$, $6\_D$, $6\_T1$, $6\_T2$, can for example be evaluated on the basis of weighing.

In absolute terms, one weighing operation could be carried out per axle, or, particularly in the case of a trailer, one weighing operation per group of trailer axles $5\_T1$, $5\_T2$.

However, for convenience, it can be simpler and quicker to weigh the entire candidate vehicle 1, 101, 201, for example on a weighbridge, in order to determine the total load of said vehicle and then to consider, at least as an initial approximation, a load distribution law that makes it possible to estimate the load $F\_Z$, $F\_D$, $F\_T1$, $F\_T2$ per axle or per tire.

Non-limitatively, an example of a load distribution law can be given for a European semi-trailer vehicle with the following specifications:

Dimensions:
  Trailer length overall: 13.6 m
  Horizontal distance from the front of the trailer 4 to the axle T1 (typically the middle axle in a group of three axles): 9.4 m
  Horizontal distance from the front of the trailer 4 to the fifth wheel 8: 1.6 m
  Horizontal distance from the fifth wheel 8 to the drive axle $5\_D$: 0.6 m
  Wheelbase between the steering axle $5\_Z$ and the drive axle $5\_D$: 3.7 m.

No-load (data supplied, in tonnes, by the vehicle registration document):
  On the steering axle $F\_5Z$: $F\_Z\_no\text{-}load=5.6$ t
  On the drive axle $5\_D$: $F\_D\_no\text{-}load=3.4$ t
  On the trailer axle (group of axles) $5\_T1$: $F\_T1\_no\text{-}load=6$ t.

If a total load F_tot is measured by weighing, the weight of the cargo F_cargo equals:

$$F\_cargo = F\_tot - (F\_Z\_no\text{-}load + F\_D\_no\text{-}load + F\_T1\_no\text{-}load).$$

An applicable load distribution law can then be, considering the cargo (and more particularly the centre of gravity of the cargo) to be centred in the trailer 4:

$F\_5Z = F\_Z\_no\text{-}load + 0.05 * F\_cargo$ $F\_D = F\_D\_no\text{-}load + 0.28 * F\_cargo$ $F\_T1 = F\_T1\_no\text{-}load + 0.67 * F\_cargo$ In any event, the weighing can particularly take place at the departure point of the vehicle 1, after loading of the vehicle, or when the vehicle passes through an inspection point.

According to another option, the load $F\_Z$, $F\_D$, $F\_T1$, $F\_T2$ exerted on each axle $5\_Z$, $5\_D$, $5\_T1$, $5\_T2$, respectively the load exerted on each tire $6\_Z$, $6\_D$, $6\_T1$, $6\_T2$, can for example be evaluated on the basis of an item of load information that is made available on a computer network 57 of the vehicle 1 by an on-board system on the vehicle, such as for example a suspension control system 10, that is suitable for adjusting the attitude (that is, the pitch and/or roll position relative to the horizontal plane) of all or part of the vehicle 1 as a function of its load.

Trucks, and in particular semi-trailer tractor units 3, are generally provided, on their rear axles $5\_D$, with a suspension control system 10, for example a pneumatic or hydropneumatic system, that makes it possible to adjust the height and/or stiffness of the suspension of said rear axle $5\_D$ to the load that the trailer 4 is exerting on the tractor unit 3, at the fifth wheel 8.

This suspension control system 10 measures the load exerted by the trailer 4 and the tractor unit 3 on the suspension, and makes this information available on the on-board computer network 57 (CAN bus).

On the basis of this information, it is possible to evaluate, more generally, by means of appropriate mathematical models, the load exerted on each axle $5\_Z$, $5\_D$, $5\_T1$, $5\_T2$ of the vehicle 1, and if applicable the load exerted on each tire $6\_Z$, $6\_D$, $6\_T1$, $6\_T2$ provided on one of said axles.

According to a further option, it could be envisaged to obtain an item of load information F_Z, F_D, F_T1, F_T2 from a monitoring system incorporated into the tire 6_Z, 6_D, 6_T1, 6_T2, such as a Tire Monitoring System (TMS) or Tire Pressure Monitoring System (TPMS), particularly as described above.

As the load per axle F_Z, F_D, F_T1, F_T2 is known, regardless of the method used to obtain this load information, an overall weighted grip index G_vehic can then advantageously be calculated, according to a preferred feature that can form an invention in its own right, that corresponds to the weighted average, on all of the axles 5_Z, 5_D, 5_T1, 5_T2 of the candidate vehicle 1 in question, of the grip indices G6_Z, G6_D, G6_T1, G6_T2, preferably the wet grip indices G6_Z, G6_D, G6_T1, G6_T2, that are specific to each of the axles 5_Z, 5_D, 5_t1, 5_T2, weighted by the load F_Z, F_D, F_T1, F_T2 that is applied to the axle in question.

Said overall weighted grip index can be expressed formally by the following formula 1:

$$\text{G\_vehic} = \frac{1}{\sum_{axles} \text{F\_axle}} \sum_{axles} \text{F\_axle} * \text{G6\_axle} \quad \text{(formula 1)}$$

where:
F_axle is the load F_Z, F_D, F_T1, F_T2 on the axle 5_Z, 5_D, 5_T1, 5_T2 in question;
G6_Axle is the grip index, preferably the wet grip index, of the tire or tires 6_Z, 6_D, 6_T1, 6_T2 of the axle in question.

Applied to the example of the semi-trailer in FIG. 2, said formula 1 will give:

$$\text{G\_vehic}(1) = \frac{1}{F_Z + F_D + F_{T1} + F_{T2}}(F_Z * G6_Z + F_D * G6_D + F_{T1} * G6_{T1} + F_{T2} * G6_{T2})$$

Advantageously, weighting the grip index G6_Z, G6_D, G6_T1, G6_T2 representing each axle 5_Z, 5_D, 5_T1, 5_T2 of the vehicle 1 by the load F_Z, F_D, F_T1, F_T2 that is applied to the axle in question makes it possible to estimate for each axle 5_Z, 5_D, 5_T1, 5_T2 a value that represents the tangential grip component of said axle on the ground 7, and therefore, more generally, to quantify accurately and take into account the specific contribution of each axle 5_Z, 5_D, 5_T1, 5_T2 to the overall braking capacity of the vehicle 1 in question.

Here, "tangential grip component" is used to denote the grip force component of the tire on the ground 7, which is tangential to the tire and the ground 7 and oriented along the front-rear longitudinal direction of the vehicle, and which therefore makes it possible to quantify the braking capacity offered by the tire in question, and more generally by the axle in question.

Advantageously, the overall weighted grip index of the vehicle G_vehic provides a braking performance score (in particular a wet braking performance score) that fully represents the braking capacity of said vehicle 1, including when the fitting of the tires 6_Z, 6_D, 6_T1, 6_T2 is not uniform from one axle 5_Z, 5_D, 5_T1, 5_T2 to the other axle of the same vehicle, as said overall weighted grip index G_vehic makes it possible to take into account, and differentiate between, configurations of the vehicle 1 in which tires 6_Z, 6_D, 6_T1, 6_T2 with different grip classes are fitted on the different axles 5_Z, 5_D, 5_T1, 5_T2, by evaluating the influence of each of these separate grip classes.

Generally, a single axle 5_Z, 5_D, 5_T1, 5_T2 will be required by regulation to be provided with tires 6_Z, 6_D, 6_T1, 6_T2 having the same grip class, and in particular the same wet grip class.

It will therefore be relevant, and if applicable, simpler, in order to carry out the load evaluations F_Z, F_D, F_T1, F_T2 and the overall weighted grip index calculation G_vehic, to reason by axle, considering the grip index G6_Z, G6_D, G6_T1, G6_T2 of the axle in question to be equal to the grip index that corresponds to the grip class that is common to the tires provided on said axle.

If applicable, if tires 6_Z, 6_D, 6_T1, 6_T2 with different grip classes are fitted on the same axle 5_Z, 5_D, 5_T1, 5_T2, for safety, the grip class, and therefore the grip index, of said axle can for example be considered to be the grip index that corresponds to the lowest grip class (that is, to the tire with the poorest braking performance) of the different grip classes of the tires provided on said axle.

As a variant, if tires 6_Z, 6_D, 6_T1, 6_T2 with different grip classes are fitted on the same axle 5_Z, 5_D, 5_T1, 5_T2, the grip class of the axle in question can be considered to correspond to an average grip class, equal to the arithmetic mean, on the axle in question, of the grip classes specific to each tire on said axle, and therefore, respectively, the overall grip index applicable to the axle in question can be considered to correspond to an average grip index, equal to the arithmetic mean of the (different) grip indices of each of the tires on the axle.

It will also be noted that, regardless of the number of axles 5_Z, 5_D, 5_T1, 5_T2, and whether each axle comprises one or more tires 6_Z, 6_D, 6_T1, 6_T2 in contact with the ground, as a variant, the overall weighted grip index calculation G_vehic described above can be applied mutatis mutandis by producing the weighted average on all of the tires 6_Z, 6_D, 6_T1, 6_T2 considered individually, rather than on the axles 5_Z, 5_D, 5_T1, 5_T2.

The following can thus respectively be carried out:
collecting, during the acquisition step (b), a grip index G6_Z, G6_D, G6_T1, G6_T2 of each of the tires 6_Z, 6_D, 6_T1, 6_T2 of the candidate vehicle 1, 101, 201 that provide contact with the ground 7,
evaluating the load F_Z, F_D, F_T1, F_T2 that is exerted by the vehicle in question 1, 101, 201 on each of said tires 6_Z, 6_D, 6_T1, 6_T2,
and calculating an overall weighted grip index G_vehic, which corresponds to the weighted average, on all of the tires 6_Z, 6_D, 6_T1, 6_T2 of the candidate vehicle in question, of the grip indices G6_Z, G6_D, G6_T1, G6_T2, preferably the wet grip indices, which are specific to each tire 6_Z, 6_D, 6_T1, 6_T2, weighted by the load F_Z, F_D, F_T1, F_T2 that is applied to the tire in question.

By analogy with the previous formula 1, a formula 2 can then be defined:

$$\text{G\_vehic}(1) = \frac{1}{\sum_{tires} \text{F\_tire}} \sum_{tires} \text{F\_tire} * \text{G6\_tire} \quad \text{(formula 2)}$$

Where:
F_tire is the load on the tire 6_Z, 6_D, 6_T1, 6_T2 in question;
G6_tire is the grip index, preferably the wet grip index, of the tire in question.

Here again, weighting the grip index G6_Z, G6_D, G6_T1, G6_T2 specific to each tire by the load exerted on the tire in question makes it possible to accurately take into account the specific contribution of each tire of the candidate vehicle 1, 101, 201 to the overall braking capacity of said candidate vehicle.

It will be noted that when an axle, and more generally each of the axles, contains several tires with the same grip class, which is in principle the case in practice, it is equivalent to calculate the overall weighted grip index G_vehic of the vehicle in question by taking the tires into account individually or by taking into account the axles more generally.

In addition, whether formula 1 (axle-based approach) or formula 2 (tire-based approach) is used, the overall weighted grip index calculation G_vehic is preferably repeated separately for each candidate vehicle 1, 101, 201 in order to be able to compare the grip performances, and therefore the braking performances, in particular the wet braking performances, of the candidate vehicles.

The candidate vehicles 1, 101, 201 can thus be classified according to their grip index, more particularly according to their overall weighted grip index G_vehic, and even more preferably according to their overall weighted wet grip index G_vehic and, if applicable, to assign said candidate vehicles a corresponding rank R in the platoon.

Conventionally, the lead vehicle will receive the rank 1, and the following vehicles consecutive ranks from 2 to the total number of vehicles forming the platoon 2.

Preferably, the vehicles 1, 101, 201 can thus be ordered in the platoon 2 in increasing order of their grip index G6, G106, G206, respectively in increasing order of their overall weighted grip index G_vehic(1), G_vehic(101), G_vehic(201), and more preferably in increasing order of their overall weighted wet grip index G_vehic(1), G_vehic(101), G_vehic(201).

The vehicle 201 having the best braking performance, in particular the best wet braking performance, that is, the vehicle 201 having the highest overall weighted grip index G_vehic(201), will thus be at the back of the platoon 2, while the vehicle 1 having the poorest braking performance, in particular on wet ground, that is, the lowest overall weighted grip index G_vehic(1), will be at the front of the platoon 2.

In addition, and preferably as a supplement to determining the rank R of each vehicle 1, 101, 201 in the platoon 2, the method can be used to determine the minimum inter-vehicle distance D101, D201 that must separate a pair of vehicles 1-101, 101-201 respectively, that are immediately one behind the other in the platoon 2.

To this end, preferably, for each candidate vehicle 1, 101, 201, a characteristic stopping distance can be calculated, as a function of a target travelling speed and the grip index G6, G106, G206 of said vehicle, and more particularly in this case as a function of a target travelling speed and the overall weighted grip index G_vehic (here preferably on wet ground), and the characteristic stopping distances of the candidate vehicles that must follow each other in the platoon can be compared two by two in order to determine, for each candidate vehicle, the minimum inter-vehicle distance D101, D201 that must separate, at the speed in question, said candidate vehicle 101, 201 in question from the vehicle 1, 101 that immediately precedes it in the platoon 2.

In particular, a law, a map or a look-up table can be used that associates a stopping distance that can have been calculated by simulation or established empirically, with different tire fitting configurations and/or, in an equivalent manner, with different grip classes, or with different grip indices or different overall weighted grip indices characteristic of the vehicle, for a given travelling speed.

Said law, map or look-up table can also take into account different load configurations of the vehicle in question, for example a scenario of an unladen vehicle and a scenario of a vehicle loaded to the maximum permitted load.

A sample extract from a look-up table, produced here for a three-axle semi-trailer and a travelling speed of 60 km/h, is given in Table 2 below:

TABLE 2

| Vehicle configuration Wet grip class | | | Wet stopping distance [m] according to the static load | |
|---|---|---|---|---|
| Axle Z | Axle D | Trailer axle T | Unladen | Fully loaded |
| A | B | A | 32.9 | 32.6 |
| A | B | C | 38.2 | 36.5 |
| A | D | C | 41.9 | 39.6 |
| C | B | A | 34.4 | 36.1 |
| C | B | C | 39.7 | 40.0 |

Preferably, the inter-vehicle distance D101 between a first vehicle 101 and a second vehicle 1 that precedes the first vehicle 101 can be selected to be equal, or substantially equal, to the difference between the stopping distance of the first vehicle and the stopping distance of the second vehicle, at the travelling speed in question.

With reference to the example in Table 2 above, if we consider a first vehicle 101 provided with tires of grip class A on the front axle of the tractor unit 105_Z, grip class B on the rear axle of the tractor unit 105_D, and grip class A on the trailer axle 105T (first row of Table 2 above), and travelling unladen, and a second vehicle 1 provided with tires of grip class C on the front axle of the tractor unit 5_Z, grip class B on the rear axle of the tractor unit 5_D, and grip class C on the trailer axle 5T (last row of Table 2 above), and travelling fully loaded, it can be seen that the wet stopping distance of the first vehicle 101, at a speed of 60 km/h, is 32.9 m, whereas the stopping distance of the second vehicle 1 is 40 m.

The inter-vehicle distance 101 between the second vehicle 1 and the first vehicle 101 following it will therefore preferably be at least, or exactly:

$D101 = 40 \text{ m} - 32.9 \text{ m} = 7.1 \text{ m}.$

If applicable, the inter-vehicle distance D101 can be between 95% and 120% of the difference between the stopping distance of the first vehicle 101 and the stopping distance of the second vehicle 1. A value greater than 100% can be selected particularly if an additional safety margin is desired. However, even in this case, a moderate value will preferably be retained, for example less than or equal to 120%, so as to retain a small inter-vehicle distance. The level of safety, which is higher the greater the inter-vehicle distance is, can thus be ensured while optimizing the energy performance, which is higher the lower the inter-vehicle distance, and the lower the aerodynamic drag and therefore the lower the fuel consumption is.

Of course, the inter-vehicle distance D101, D201 can be adjusted dynamically, so that it is updated, if applicable in real time, when the travelling speed of the platoon 2 changes, or when the order of the platoon 2 changes, or when the platoon 2 is modified due to one or more vehicles leaving the platoon or joining said platoon.

As mentioned above, the target travelling speed will typically be between 60 km/h and 100 km/h, and more particularly between 70 km/h and 90 km/h.

The speed of one or other of the vehicles 1, 101, 201 in the platoon, and preferably of each of the following vehicles 101, 201, or even of all of the vehicles in the platoon 2, can be automatically governed by an appropriate speed controller, provided on each vehicle, that will apply said target travelling speed as a setpoint during normal travel, that is, in the absence of braking action.

Particularly preferably, the method will be used both to determine the rank R of the candidate vehicles 1, 101, 201, and therefore the order of the platoon 2, and then to determine, once this order is known, the inter-vehicle distance D101, D201 between each pair of vehicles (one preceding vehicle/one following vehicle) in the platoon 2.

According to such a variant, during the processing step (c), each candidate vehicle 1, 101, 201 can be assigned a rank R in the platoon 2 as a function of the grip index, respectively as a function of the overall weighted grip index G_vehic (preferably on wet ground) of the vehicle in question, and then the inter-vehicle distance D101, D201 applicable to each pair of vehicles can be determined, taking into account the rank assigned.

In addition, according to a preferred feature that can form an invention in its own right, the wear intensity (WI) of the at least one tire 6, 106, 206 in question can be taken into account for organizing the platoon 2.

Typically, the wear intensity WI of a tire 6, 106, 206 is determined by the residual depth (radial height) of the tread patterns H_patterns of the tire 6, 106, 206, compared with the depth H_new of said patterns when the tire is new.

The wear intensity WI can be measured by any appropriate means, either manually or automatically when the vehicle 1, 101, 201 passes over a section of carriageway provided with an appropriate thickness sensor 20, such as for example an electromagnetic or induction sensor, making it possible to estimate the thickness of the tread patterns by telemetry.

Such a thickness sensor 20 can be incorporated into a telematics box 21 external to the vehicle 1, 101, 201.

Said telematics box 21 will preferably be incorporated into the ground 7 or a road infrastructure, such as a gantry.

By way of example, said telematics box 21 can comprise one or more sensors, including for example the thickness sensor 20, which are embedded in a section of carriageway, for example in a speed hump, and that are suitable for activating a transponder 9, or reacting to the presence of a transponder 9 placed in the tire, in order to gather various items of information and/or measurements relating to the tire, such as for example the tire identifier ID_tire, the actual depth H_patterns of the tread patterns of said tire 6, and/or a vehicle identifier ID_vehic of the vehicle 1, 101, 201 on which the tire 6 is mounted.

The wear intensity WI can particularly be evaluated by comparing the actual residual depth of the tread patterns of the tire H_patterns, measured on the thickness sensor 20, with the depth of the tread patterns of the new tire H_new, which can for example be obtained from a database supplied by the manufacturer, knowing the identifier ID_tire of said tire.

Advantageously, regardless of the means used to evaluate the wear intensity WI, the grip index G6, G106, G206 of the tire in question, in particular in question for determining the rank R of the vehicle 1, 101, 201 in the platoon 2 and/or the inter-vehicle distance D101, D201, can be adjusted as a function of the wear intensity WI.

Indeed, the wear of the tire has an influence on the grip capacity, and therefore on the braking performance, of said tire.

Taking the wear intensity WI into account therefore makes it possible to make the evaluation of the braking performance of the vehicle 1, 101, 201 and therefore the determination of the rank R and/or the inter-vehicle distance D101, D201, even more accurate and reliable.

More particularly, and particularly in relation to one or other of the steps described above, particularly for the calculation of the overall weighted grip index G_vehic, the wet grip index G6, G106, G206 of the tire 6, 106, 206 in question can be taken into account, and this wet grip index can be corrected by applying to it a correction factor that decreases, according to a predetermined law, when the wear intensity WI of the tire increases.

The inventors have noted that, on some tires, the wet braking performance decreases when the wear of the tire increases.

By convention, it can be considered that the wear intensity WI equals 0 (0%) when the tire 6, 106, 206 is new, and equals 1 (100%) when the tire is totally worn, that is, when the residual height of its tread patterns H_patterns reaches the height H_indicator of a wear indicator that is provided at the bottom of the tread pattern.

In this regard, the following can for example be stated:

$$WI = \frac{(H_{patterns} - H_{new})}{(H_{indicator} - H_{new})}$$

where:

H_patterns is the depth of the tread patterns of the tire 6 at the moment in question;
H_new is the depth of the tread patterns of the new tire 6;
H_indicator is the height of the wear indicator relative to the bottom of the tread pattern.

The depth of the tread patterns H_patterns will preferably be checked periodically, at predetermined time intervals, for example once a month, and the wear intensity WI updated accordingly.

The inventors have also noted that, generally, a lengthening of the order of 15% of the wet stopping distance can be observed when the wear intensity reaches 100% (that is, when the tread patterns reach the wear indicator).

As a result, a model for the adjustment of the wet grip index can be proposed according to a decreasing function of the wear intensity WI, for example according to an affine function, such as:

$$G6 = G6_{new} * (1 - WI * f1)$$

where:

G6_new is the wet grip index of the tire 6 in new condition;
WI is the wear intensity of between 0 (new tire) and 1 (totally worn tire);
f1 is the grip deterioration factor, for example f1=0.15 (that is, 15%, which corresponds to the grip deterioration empirically noted between a new tire and a completely worn tire).

The correction factor applied to the grip index G6 corresponds in this case to the value (1−WI*f1).

The deterioration factor f1 can be determined empirically.

Preferably, said deterioration factor f1 will be between 0.10 and 0.20, and for example equal to 0.15.

In practice, the wear intensity of the tires on the same axle is generally quite similar from one tire to another, so that this wear intensity can be applied to the grip index of the axle in question.

This being the case, in the event that the same axle 5_Z, 5_D, 5_T1, 5_T2 comprises several tires having different wear intensities WI, either a tire-based approach according to the formula 2 above could be adopted or, for safety, the least favourable wear intensity could be considered to apply to the entire axle in question when calculating the overall weighted grip index G_vehic according to the formula 1.

Ultimately, the formula 1 (axle-based approach) can be adapted to take the wear into account:

$$G\_vehic = \frac{1}{\sum_{axles} F_{axle}} \sum_{axles} F_{axle} * G6_{new\_axle} * (1 - WI * f1)$$

where:
F_axle is the load exerted on the axle;
G6_new_axle represents the wet grip index, in new condition, of the tire or all of the tires fitted on the axle in question;
WI is the wear intensity of between 0 (new tire) and 1 (totally worn tire);
f1 is the grip deterioration factor, as described above.

Similarly, the formula 2 (individual tire-based approach) can be adapted as follows:

$$G_{vehic} = \frac{1}{\sum_{tires} F_{tire}} \sum_{tires} F_{tire} * G6_{new} * (1 - WI * f1)$$

Figure 3:
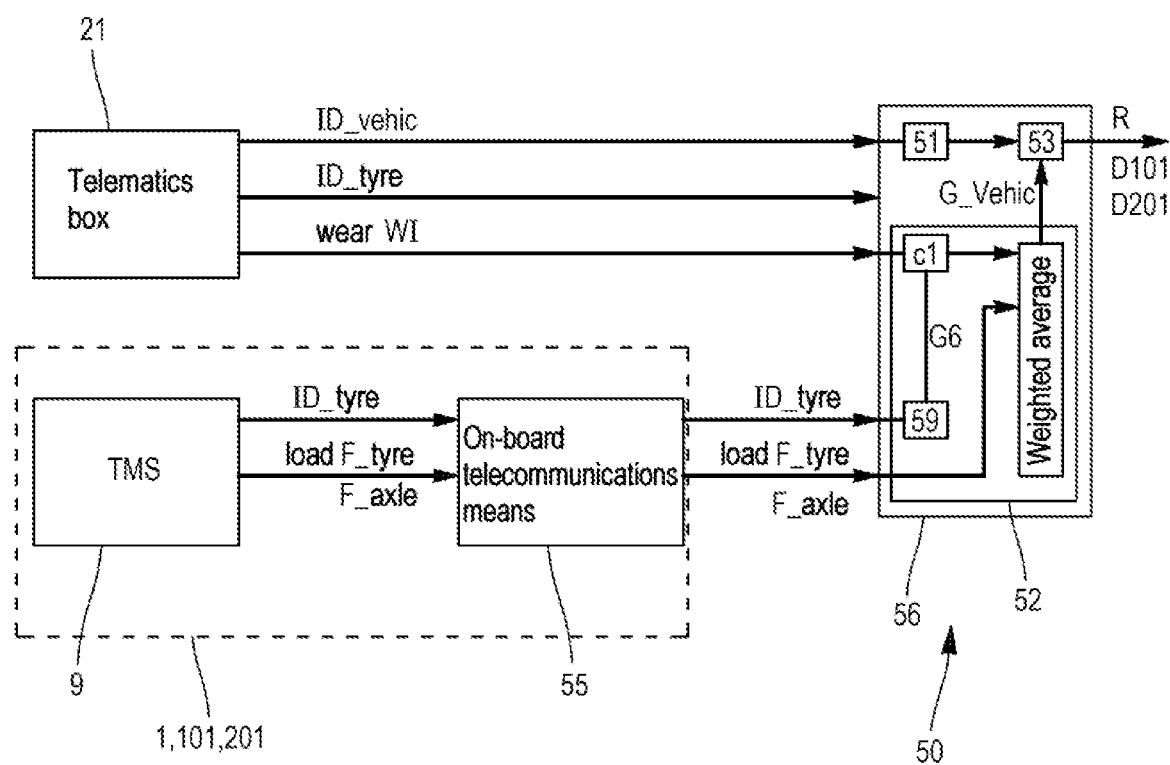
FIG. 3 is block diagram of the implementation of a method according to the present disclosure.

An example of the operation of the method according to the present disclosure will now be described briefly with reference to the variant illustrated in FIG. 3.

Several candidate vehicles 1, 101, 201, here for example three vehicles, wish to form a platoon 2.

At least two of these candidate vehicles 1, 101, 201, and in particular at least two of the tractor units 3, 103, 203, can be different brands (and more particularly originate from different vehicle manufacturers).

Each candidate vehicle 1, 101, 201 makes itself known to the platoon formation remote server 56 by making a request (request to join a platoon), which is remotely transmitted to the identification unit 51 of said remote server 56 by telecommunications means 55 on board the candidate vehicle. Any appropriate electronic data exchange protocol can of course be used to this end.

Each candidate vehicle 1, 101, 201 sends the characterization unit 52 of the remote server 56 either the wet grip indices G6, G106, G206 of its tires 6, 106, 206, or respectively the wet grip indices of each of its axles 5, 105, 205 directly, or the identifier ID_tire of its tires 6, 106, 206, by axle, on the basis of which the acquisition module 59 present on the server 56 can, by cross-referencing with a database, identify the corresponding wet grip indices G6, G106, G206.

On the basis of the last known wear intensity WI, for example on the basis of the most recent passage of the vehicle 1, 101, 201 over a telematics box 21, the characterization unit 52 corrects said wet grip indices G6, G106, G206, by applying the correction factor to them, which here preferably equals (1−Wi*f1), WI being the wear intensity applicable to the tire, or to the axle, in question.

In addition, each vehicle 1, 101, 201 also sends the server 56 its load per axle F_axle or, if applicable, its load per tire F_tire, either directly or by means of a weighing station interconnected to the server 56.

The characterization unit 52 then calculates the weighted average of the wet grip indices, corrected depending on the wear intensity WI, and weighted by the load applicable per axle, F_axle, respectively per tire F_tire.

The characterization unit 52 deduces therefrom, for each candidate vehicle, an overall weighted grip index G_vehic, which represents the wet braking performance of said vehicle.

The ordering unit 53 then compares the overall weighted wet grip indices G_vehic(1), G_vehic(101), G_vehic(201) of the different candidate vehicles 1, 101, 201, so that it can deduce therefrom the order of the platoon, and therefore the rank R that said ordering unit assigns to each candidate vehicle 1, 101, 201.

Here, for example, if G_vehic(1)<G_vehic(101)<G_vehic(201), then the decision will be made to place vehicle 1 (R=1) so that said vehicle 1 comes before vehicle 101 (R=2), which in turn comes before vehicle 201 (R=3).

Depending on the target travelling speed, which will be common to all of the vehicles 1, 101, 201, the ordering unit 53 also sets the inter-vehicle distance D101, D201 between each following vehicle and the vehicle that immediately precedes it ("preceding vehicle"), as was described above.

The platoon formation server 56 then sends each vehicle 1, 101, 201 its rank R in the platoon 2, together with the inter-vehicle distance D101, D201 that said vehicle must observe relative to the vehicle that precedes it in the platoon.

The vehicles 1, 101, 201 then line up according to their respective rank R, and position themselves relative to each other, at the speed in question, according to the inter-vehicle distances D101, D201 imposed upon them.

Of course, these rank R and inter-vehicle distance D101, D201 parameters are capable of being modified whenever necessary, particularly when an initially following vehicle replaces the initially lead vehicle at the front of the convoy (although it may mean that the order of the platoon no longer corresponds exactly to the increasing order of the braking performances of the vehicles), or when one or more vehicles leave the platoon 2, or when one or more candidate vehicles wish to join the existing platoon.

All of the functions described above, and particularly the identification, tire parameter collection, grip index calculation and correction, in particularly overall weighted wet grip index calculation G_vehic, and rank R or inter-vehicle distance D101, D201 determination functions, can each be performed by any appropriate computer, said computer being able to be on board the vehicle 1, 101, 201 in question, or situated on one or more remote servers 56, or shared between the vehicle and the remote server.

Of course, the invention is in no way limited to the variant embodiments described above, and a person skilled in the art could particularly isolate or freely combine any of the aforementioned features, or replace them with equivalent features.

The invention claimed is:

1. A method for organizing a group of several separate vehicles into a platoon, within which said vehicles are ordered into a line, and within which each vehicle following at least one other vehicle in said platoon is capable of automatically adjusting its individual driving behavior as a function of the driving behavior of one or more vehicles in the platoon that precede said vehicle in said line, said method including the following steps:

an identification step (a), during which the vehicles intended to form the platoon, known as "candidate vehicles" are identified, each of said candidate vehicles being provided with at least one axle that comprises at least one tire providing contact between said candidate vehicle and the ground, an acquisition step (b), during which, for each candidate vehicle, at least one parameter is acquired that is linked to said at least one tire providing the contact between said candidate vehicle and the ground, known as the "tire parameter", the tire parameter being a grip index that quantifies the capacity of the tire in question to grip the ground during braking, and wherein an axle load that is exerted on each tire that contacts the ground is evaluated, and wherein an overall weighted grip index (G_vehic) is calculated based on the grip indices of all of the tires in contact with the ground and on the axle loads that are exerted on those tires, a processing step (c), during which, on the basis of said overall weighted grip index, the rank is determined that is attributed to the candidate vehicle in question in the platoon and/or the inter-vehicle distance is determined that must separate, at a given speed, the candidate vehicle in question from the vehicle that immediately precedes said candidate vehicle in the platoon, and controlling each vehicle of the platoon such that the vehicles are in their corresponding proper rank that is determined and/or such that they have the determined separation between themselves and their adjacent preceding vehicle.

2. The method according to claim 1, wherein the grip index in question corresponds to a wet grip index.

3. The method according to claim 2, wherein the wet grip index is defined by European Regulation (EU) No 228/2011 if the candidate vehicle is a passenger vehicle, or by ISO 15222 if the candidate vehicle is a truck or a van.

4. The method according to claim 1, wherein the grip index corresponds to a wet grip index value that is deduced from a standardized wet grip class that is shown on the identification labelling of the tire.

5. The method according to claim 4, wherein the wet grip class that is shown on the identification is in accordance with European Regulation (EC) No. 1222/2009.

6. The method according to claim 1, wherein the load exerted on each axle, respectively on each tire, is evaluated on the basis of a weighing operation, or on the basis of an item of load information that is made available on a computer network of the vehicle by an on-board system on the vehicle.

7. The method according to claim 1, wherein the vehicles are ordered in the platoon in increasing order of their overall weighted grip index.

8. The method according to claim 1, wherein for each candidate vehicle, a characteristic stopping distance is evaluated, as a function of a target travelling speed and the grip index of said vehicle, respectively as a function of a target travelling speed and the overall weighted grip index (G_vehic), and the characteristic stopping distances of the candidate vehicles that must follow each other in the platoon are compared two by two in order to determine, for each candidate vehicle, the minimum inter-vehicle distance that must separate, at the speed in question, said candidate vehicle in question from the vehicle that immediately precedes it in the platoon.

9. The method according to claim 1, wherein in order to organize the platoon, a wear intensity of the at least one tire in question is taken into account.

10. The method according to claim 9 wherein the grip index corresponds to a wet grip index value of the tire in question, and this wet grip index is corrected by applying to it a correction factor that decreases, according to a predetermined law, when the wear intensity of the tire increases.

11. A system for managing a platoon of vehicles suitable for organizing a platoon of several separate vehicles, each provided with at least one axle that comprises at least one tire providing contact between said vehicle and the ground, said system comprising the following electronic processing units:

an identification unit that identifies and lists the vehicles intended to form the platoon, known as "candidate vehicles", a characterization unit that collects, for each candidate vehicle, at least one parameter linked to said at least one tire providing the contact between said candidate vehicle and the ground, known as the "tire parameter", the tire parameter being a grip index that quantifies the capacity of the tire in question to grip the ground during braking, the characterization unit further evaluating an axle load that is exerted on each tire that contacts the ground and calculating an overall weighted grip index (G_vehic) based on the grip indices of all of the tires in contact with the ground and on the axle loads that are exerted on those tires, an ordering unit that determines, on the basis of said tire parameter, a rank that it assigns to the candidate vehicle in question in the platoon and/or an inter-vehicle distance setpoint that sets the distance that must separate, at a given speed, the candidate vehicle in question from the vehicle that immediately precedes it in the platoon, and at least one control unit that controls the vehicles of the platoon such that the vehicles are in their corresponding proper rank that is determined and/or such that they have the determined separation between themselves and their adjacent preceding vehicle.

12. The system for managing a platoon of vehicles according to claim 11, wherein the grip index is a wet grip index that represents the wet grip class of the at least one tire in question.

13. The system according to claim 11, wherein the tire parameter is obtained by remote transmission on the basis of an item of information transmitted by a transponder implanted in the tire in question.

* * * * *